US009670636B2

(12) United States Patent
Ratti et al.

(10) Patent No.: US 9,670,636 B2
(45) Date of Patent: Jun. 6, 2017

(54) AQUA-ROBOTIC POLLUTANT REMOVING SYSTEMS AND DEVICES, AND METHODS OF REMOVING POLLUTANTS FROM BODIES OF WATER

(71) Applicant: MASSACHUSETTS INSTITUTE OF TECHNOLOGY, Cambridge, MA (US)

(72) Inventors: Carlo F. Ratti, Turin (IT); Assaf Biderman, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 442 days.

(21) Appl. No.: 14/108,088

(22) Filed: Dec. 16, 2013

(65) Prior Publication Data

US 2014/0158591 A1   Jun. 12, 2014

Related U.S. Application Data

(63) Continuation of application No. 13/169,234, filed on Jun. 27, 2011, now abandoned.
(Continued)

(51) Int. Cl.
*B01D 17/02* (2006.01)
*B01D 21/00* (2006.01)
(Continued)

(52) U.S. Cl.
CPC ........ *E02B 15/046* (2013.01); *B01D 21/0027* (2013.01); *B82Y 30/00* (2013.01);
(Continued)

(58) Field of Classification Search
CPC ...... E02B 15/04; E02B 15/045; E02B 15/046; E02B 15/047; E02B 15/048; E02B 15/10; E02B 15/104; C02F 1/008; C02F 1/40; C02F 2209/008; B82Y 30/00; B25J 9/16; B25J 9/1602; B25J 9/161; B25J 9/1628; B25J 9/1694; B25J 9/20; B25J 11/00; B25J 13/00; B25J 13/006; B25J 13/08; B25J 13/087; B25J 13/088; B25J 13/089; B01D 17/02; B01D 17/04; B01D 17/12;
(Continued)

(56) References Cited

U.S. PATENT DOCUMENTS 3,618,768 A * 11/1971 Brown .................. E02B 15/105
                                                210/242.1
3,731,813 A *  5/1973 Tipton .................. E02B 15/046
                                                210/242.3
(Continued)

OTHER PUBLICATIONS

Publication by Kakalis et al, "Robotic swarm concept for efficient oil spill confrontation", Journal of Hazardous Materials, vol. 154, pp. 880-887, Published 2008, Available online Feb. 20, 2008.*

*Primary Examiner* — Joseph Drodge
(74) *Attorney, Agent, or Firm* — Sam Pasternack; MIT Technology Licensing Office (57) ABSTRACT

An aqua-robotic pollutant removing device includes a buoyant body, an electromechanical housing coupled to the buoyant body, and a pollutant absorbing belt coupled to the electromechanical housing and extending outward from the buoyant body. The electromechanical housing is constructed and arranged to rotate the pollutant absorbing belt.

35 Claims, 5 Drawing Sheets

Related U.S. Application Data (60) Provisional application No. 61/376,189, filed on Aug. 23, 2010, provisional application No. 61/358,648, filed on Jun. 25, 2010.

(51) Int. Cl.
  *C02F 1/40* (2006.01)
  *B82Y 30/00* (2011.01)
  *E02B 15/04* (2006.01)
  *E02B 15/10* (2006.01)
  *C02F 1/00* (2006.01)

(52) U.S. Cl.
  CPC ............... *C02F 1/008* (2013.01); *C02F 1/40* (2013.01); *E02B 15/045* (2013.01); *E02B 15/104* (2013.01)

(58) Field of Classification Search
  CPC ...... B01D 21/00; B01D 21/0027; E04H 4/16; E04H 4/1654
  USPC ......... 210/85, 96.1, 143, 122, 242, 1, 242.3, 210/170.11, 747.5, 923, 924, 925; 977/762; 700/245, 247, 248, 259, 273; 901/1, 46, 50
  See application file for complete search history.

(56) References Cited

U.S. PATENT DOCUMENTS

| | | | | |
|---|---|---|---|---|
| 3,986,959 A | * | 10/1976 | Bagot | E02B 15/101 210/242.4 |
| 3,992,292 A | * | 11/1976 | Grimes | B01D 17/0202 210/242.4 |
| 4,061,569 A | * | 12/1977 | Bennett | E02B 15/104 210/671 |
| 4,132,648 A | * | 1/1979 | Miller | B01D 17/0214 210/242.1 |
| 4,341,637 A | * | 7/1982 | Smith | E02B 15/104 210/143 |
| 4,978,448 A | * | 12/1990 | Terokomos | E02B 15/104 210/242.3 |
| 5,015,378 A | * | 5/1991 | Lewan | B01D 17/0214 210/241 |
| 5,056,958 A | * | 10/1991 | Campbell | E02B 15/08 210/924 |
| 5,262,048 A | * | 11/1993 | Zimmerman | C02F 1/681 210/232 |
| 5,753,108 A | * | 5/1998 | Haynes | E02B 15/104 210/122 |
| 5,857,534 A | * | 1/1999 | DeVault | F16L 55/28 180/21 |
| 6,548,982 B1 | * | 4/2003 | Papanikolopoulos | B62D 57/02 318/568.11 |
| 6,743,358 B1 | * | 6/2004 | Lundback | E02B 15/106 210/242.3 |
| 8,216,543 B2 | * | 7/2012 | Chen | B01J 20/06 210/501 |
| 2006/0113259 A1 | * | 6/2006 | Brunone | B65G 15/60 210/776 |
| 2007/0158253 A1 | * | 7/2007 | Kellett | B63B 35/32 210/776 |
| 2009/0057217 A1 | * | 3/2009 | Bartha | B09C 1/00 210/209 |

\* cited by examiner

AQUA-ROBOTIC POLLUTANT REMOVING SYSTEMS AND DEVICES, AND METHODS OF REMOVING POLLUTANTS FROM BODIES OF WATER

RELATED APPLICATIONS

This application claims the benefit of U.S. Provisional Application No. 61/358,648, filed Jun. 25, 2010 and U.S. Provisional Application No. 61/376,189, filed Aug. 23, 2010, the contents of which are incorporated herein by reference in their entirety.

TECHNICAL FIELD

The present application generally relates to pollutant removing systems, devices and methods, and more particularly, to robotic pollutant removing systems and devices, and methods of removing pollutants from bodies of water.

BACKGROUND

In 2010 a massive explosion occurred on a Deepwater Horizon drilling rig, which resulted in a massive oil spill in the Gulf of Mexico. The oil spill stemmed from a sea floor oil gusher, which was located well below the ocean surface. To date, this oil spill is one of the largest offshore spills in United States history, with tens of millions of gallons of crude oil spilled into the Gulf of Mexico. The spill has resulted in an environmental disaster having an extensive impact on marine and wildlife habitats. The spill has also damaged the Gulf of Mexico tourist and fishing industries.

As a result of oil spills, catastrophe response teams generally focus their efforts on three types of contaminated zones: 1) in a first zone, there are vast surface areas (of the ocean) where crude oil has created a continuous pollutant layer, 2) in a second zone, there are vast surface areas (of the ocean) where crude oil has created dispersed pollutant layers, and 3) in a third zone, there are areas where the oil spill has resulted in under-water volumes of cloud pollutants.

In response, there have been a variety of ongoing efforts to remove spilled oil from the ocean. However, many of the efforts have proven ineffective, economically and technically impossible or at least inefficient given the large scale of oil spills of the type described above.

SUMMARY

Robotic pollutant removing systems and devices, and methods of removing pollutants from bodies of water, according to various embodiments of the present inventive concepts, are described herein. The robotic pollutant removing systems and devices describe herein may be configured to collect chemical pollutants and/or exogenous bodies (e.g., ocean garbage) dispersed about the ocean. In some embodiments, the devices and systems operate autonomously, and may be configured to power themselves from the environment (e.g., solar power, wind power, ect.) and/or from collecting and refining the chemical pollutants dispersed about the ocean.

Robotic pollutant removing systems and devices of the present inventive concepts may include one or more aqua-robotic mechanisms capable of collecting pollutants from water bodies while afloat in contaminated spill zones. Additionally or alternatively, the aqua-robotic mechanisms may be capable of plunging beneath the surface of the water bodies to access underwater volumes of pollutants.

Robotic pollutant removing systems and devices of the present inventive concepts may include a self-powering mechanism or devices that can energize the over-all system. The self-powering mechanism or device may include a combustion based system that operates on fuel that is refined on-board the robotic pollutant removing systems and devices. Additionally or alternatively, the self-powering mechanism or device may include powering systems that tap into natural sources of energy. For example, the power systems may generate energy from natural resources such as solar energy, wind energy or the energy extracted from the constant oscillation of the unit due to natural movement of water on which the unit is floating.

Robotic pollutant removing systems and devices of the present inventive concepts may include an integrated pollution collecting system. For example, the systems and devices may include an integrated fossil fuel collecting mechanism that includes hydro-phobic ultra-absorbent material for collecting fossil fuel based contaminants from water bodies.

Robotic pollutant removing systems and devices of the present inventive concepts may include a pollution extraction system. For example, the systems and devices may include heating and/or ultra sonic radiation mechanisms and devices that are constructed to extract collected pollutants from the integrated fossil fuel collecting mechanism and device.

Robotic pollutant removing systems and devices of the present inventive concepts may include a local pollution disposal system. For example, the systems and devices may include a burning system for disposing of pollutants and/or a container system for storing pollutants. The container system may include one or more light-weight, expandable containers that can be used by the unit to store collected, un-refined or refined pollutants. The stored pollutants can be carried along by the systems and devices to an on-shore depot base or left afloat to be collected by other aquatic pick-up vehicles. The systems and devices may also include an onboard refinery for refining the collected pollutants to be used for propulsion and/or operation of the systems and devices.

Robotic pollutant removing systems and devices of the present inventive concepts may include embedded chemical sensors for detecting and registering the presence of pollutants, such as fossil fuel based contaminants in the ocean.

Robotic pollutant removing systems and devices of the present inventive concepts may include embedded location sensing and positioning sub-systems that can be configured to register both real-time location data and geographical point data corresponding to locations where the presence of pollutants are detected in the water.

Robotic pollutant removing systems and devices of the present inventive concepts may include embedded locomotion actuators that allow the system to navigate the surface of a water body.

Robotic pollutant removing systems and devices of the present inventive concepts may include an integrated sail-shape structure for providing propulsion and/or steering capabilities to the systems and devices.

Robotic pollutant removing systems and devices of the present inventive concepts may include embedded short-range and long-range data transmission mechanisms and devices that allow the systems and devices to communicate with other devices in a network or with a central data aggregation and control/command system. For example, the presence and location of contaminated areas and/or appropriate collective or individual courses of action can be communicated to and/or between the devices.

Robotic pollutant removing systems and devices of the present inventive concepts may include an embedded micro-processor that is configured to regulate the functionality of device sub-systems and to maintain operational integrity of the devices. The micro-processor may be further configured with patter recognition algorithms, which in conjunction with a memory and data storage unit, can keep track of past states of the unit and make predictions based on recognized patterns regarding the appropriate future course of action of the device.

Robotic pollutant removing systems and devices of the present inventive concepts may include an integral pneumatic plunging/re-surfacing mechanism or device that allows the devices to operate beneath the ocean surface so that underwater pollution can be captured.

Robotic pollutant removing systems and devices may include an embedded pressure sensor that allows the devices to register the depth of water for the purpose of way finding under water and at different levels while sinking and resurfacing.

Robotic pollutant removing systems and devices of the present inventive concepts may include on-board chemical sensors that may allow the systems and devices to register the existence of pollutants, such as fossil fuel based soluble pollutants within an effective range of the sensors. Further, the systems and devices may include satellite positioning and location devices (e.g., GPS). Such positioning and location devices can register and/or track the geographical location of the systems and devices, and may further register and track the existence of pollutants that are sensed by the chemical sensors. In addition, the systems and devices may be equipped with short-range and/or long-range communication systems that can allow for the transmission of wireless signals to one or more other systems and devices and/or a central control system or server. In this manner, systems and devices that sense the existence of pollutants within a body of water can transmit its geographical location to the one or more other systems and devices and/or a central control system or server for relay. This allows the systems and devices to hunt for contaminated areas based on information gathered collectively by a plurality of systems and devices. Further, the systems and devices can be controlled by a centralized control system or server, which can transmit navigational commands to the systems and devices. In such a system, operators may also identify contaminated areas within a given water body (for example, through analysis of satellite imagery) and transmit a navigational commands to the systems and devices.

Robotic pollutant removing systems and devices of the present inventive concepts may be designed so that they can float on water, and may power themselves with energy collected from the environment. For example, the systems and devices may include a sail-like component that allows them to navigate the water body by riding the wind in cased where their intended navigational course is parallel to the direction of air current. In the absence of agreeable wind conditions, the systems and devices may be powered via renewable, natural energy resources such as solar energy and wind energy. Additionally or alternatively, the systems and devices may include an on-board refinery to treat and/or refine collected pollutants into fuel that can be used to power the systems and units via, for example, a standard combustion engine or generator.

Once the robotic pollutant removing systems and devices arrive at a contaminated area, by way of differential sensing operational modes, the unit may move along the periphery of the contaminated area while collecting chemical pollutants. Over time, the surface area of the contaminated zone decreases and is finally consumed. The above mentioned differential sensing mechanism may include one or more chemical sensors embedded above or below the floating surface of the systems and devices in a cross shape arrangement. Through computational processes running on the on-board micro-processing system, the systems and devices may be configured to detecting the edge of the contaminated surface layer and move along that edge collecting pollutants, away from a direction of the sensor that is sensing less contamination and towards a direction of the sensor that is registering more contamination. Accordingly, the on-board micro-processing system may be coupled to the one or more sensors, and may be coupled to one or more locomotive actuators that are configured to move the systems and devices. In this fashion the trajectory of movement of the systems and devices will evolve as an intruding spiral towards the center of the contaminated pollutant layer. This sweeping pattern would help prevent the pollutants from further dispersal while the aquatic cleaning mission is in operation.

In cases where an oil spill results in under-water continuous or dispersed volumes of pollutants, the systems and devices may make use of an integral pneumatic plunging/re-surfacing mechanism to get access to the under water contaminated zones, and may resurface after the cleaning process is done. To this effect, and for the purpose of underwater three-dimensional way finding and navigation, the systems and devices may be enhanced with a pressure sensor that allows it to register the depth to which the systems and devices have plunged.

Robotic pollutant removing systems and devices of the present inventive concepts may include a local pollution collection system. In the case of oil, the local pollution collection system may include a hydro-phobic ultra absorbent material that is configured to float on the surface of the water body, and may be dragged along by the systems and devices. In some embodiments, the systems and devices may include an inflatable or sponge like part, covered with a particular class of Carbon nanotubes that are both ultra-absorbent and hydro-phobic. In this manner, a large amount of fossil fuel based soluble pollutant such as oil can be collected.

Once fossil fuel based soluble pollutants are collected by the systems and devices, the systems and devices may apply heat and/or ultra-sonic radiation to collection devices to extract the collected pollutants. Once extracted, the pollutants can be refined on-board the systems and devices by an on-board refinery. For example, the pollutants can be refined to standard variations of fossil fuel products. The refine fuel can be used to power the systems and devices.

The collected pollutants can also be condensed to a liquid state without being refined, to be burnt onboard or carried to depot stations on shore or off-shore, or to be left in light-weight flexible containers floating on the surface of the water body to be collected and carried to the on-shore or off-shore depot areas by other aquatic vehicles. For example, the systems and devices may include multiple light-weight, floatable and inflatable containers that can be filled with condensed or uncondensed, un-refined pollutants. Once left afloat, the container may be provided with localization systems that are configured to register its location (real-time or periodically), and may transmit its location for pick up by a patrolling pick-up aquatic vehicle. The container may further transmit its location to a central command and control system, where the location information of multiple floating containers is aggregated and relayed to patrolling aquatic pick-up vehicles.

Robotic pollutant removing systems and devices of the present inventive concepts may include extraction systems for extracting pollutants collected by the pollution collection systems. In some embodiments, the extraction systems may include heating systems and/or ultra-sonic radiation systems that are configured to extract pollutants from the pollution collection systems, such as the ultra-absorbent material. In this manner, the systems and devices are capable of self-cleaning in situ, while floating and in operation on the water body. Accordingly, the systems and devices may not need to go back to a maintenance depot on-shore or off-shore base to be cleaned, at intervals. This ensures continuous and seamless operation of the systems and devices.

As noted above, robotic pollutant removing systems and devices of the present inventive concepts may be equipped with short-range and/or long-range transceiver systems, which allow the systems and devices to send and receive information about the presence and location of contaminated zones. This allows a network or swarm of systems and devices to operate in a networked condition both in peer-to-peer and centralized information flow architectures. In a peer-to-peer mode, the systems and devices can communicate information with each other which allows them to create a self-organizing network of sensor/actuator probes that dynamically determine an appropriate course of action based on emerging situations of how the pollutant layer is spread over the water body. In the peer-to-peer network created among systems and devices, each system or device can function as transmitter of information, a receiver of information or as an intermediate node to relay information further to other units. This allows the systems and devices to manifest a swarming behavior. In the centralized mode, the systems and devices may report information back to a central data aggregation and/or command/control unit. On the central server, automated computational processes may analyze the received data and decide upon an appropriate course of action in terms of the navigation route of individual systems and devices of the network or swarm, and may relay this information back to the systems and devices. Further, at the central control and command center, human agents can initiate alerts to the probing units and direct them to contaminated zones intervening with the automated central command/control system. Both in peer-to-peer and centralized modes of operation, pattern recognition algorithms that also have access to weather forecast and data servers pertaining to real-time aquatic activities of the geographic region, including but not limited to satellite imagery, under-water currents and direction and speed of wind, allow the distributed and centralized system to predict the future direction and intensity of how the pollutants will spread over the region so that future course of collective and individual action can be algorithmically determined.

Robotic pollutant removing systems and devices of the present inventive concepts described herein have advantages over the conventional methods for cleaning contaminated zones. For example, conventional methods include using small and mid-size boats that tow nets, in which the contaminants are trapped. This system is inefficient. First, instead of sweeping vast contaminated areas, as in the above robotic pollutant removing systems and devices, the towing boat cuts through the contaminated zone leaving a cleaned line behind. It is quite reasonable to assume that such an approach will not result in a completely swept zone, since it is hard to cover a vast surface area with almost haphazard cleaned lines. Secondly, given the constant oceanic movement, the oil spill keeps dispersing, and cuts through do a very poor job in terms of preventing further dispersion of the pollutants. Thirdly, the pollutants captured within the towed nets is not dealt with on-board the ship while afloat, and needs to be carried to an on-shore facility to be deposited. This means that through time and as the volume of collected pollutants increases, it becomes harder and more energy consuming for the towing boat to move and drag the net along with it. Fourthly, through time, the net capability in terms of trapping the contaminants decreases due to the deterioration in quality caused by contact with the contaminant, and the boat has to go back to a base to replace the net since the collecting mechanism is not capable of self-cleaning or regeneration. Fifthly, the conventional methods do not address situations where the oil spill is extremely atomized or has plunged under water and only deals with cases where the contamination is in form of floating continuous zones on the surface of a water body. Lastly, the conventional methods and systems, function based on stand alone patrolling aquatic carriers that are not communicating with each other and are not capable of manifesting swarm-like intelligent behavior in terms of self-organizing and collective decision making for appropriate course of action given the real-time state of pattern of dissemination and over-all dispersion of the pollutants.

In one aspect, an aqua-robotic pollutant removing device comprises a buoyant body, an electromechanical housing coupled to the buoyant body, and a pollutant absorbing belt coupled to the electromechanical housing and extending outward from the buoyant body. The electromechanical housing is constructed and arranged to rotate the pollutant absorbing belt.

In some embodiments, the body includes a foam material.

In some embodiments, the body includes one or more rudders that are constructed and arranged to steer the device.

In some embodiments, the electromechanical housing includes one or more motors constructed and arranged to rotate the pollutant absorbing belt.

In some embodiments, the pollutant absorbing belt includes an oil-absorbing belt.

In some embodiments, the pollutant absorbing belt includes a nanowire fabric.

In some embodiments, the nanowire fabric is constructed to absorb greater than 15 times its weight in organic pollutants.

In some embodiments, the nanowire fabric includes a plurality of potassium manganese oxide wires.

In some embodiments, the aqua-robotic pollutant removing device further comprises a control system configured to control the rotational velocity of the pollutant absorbing belt.

In some embodiments, the aqua-robotic pollutant removing device further comprises one or more photovoltaic panels.

In some embodiments, the one or more photovoltaic panels are provided on an upper surface of the buoyant body.

In some embodiments, the one or more photovoltaic panels are configured to supply the control system and actuators of the electromechanical housing with electrical current.

In some embodiments, the control system includes one or more communication devices.

In some embodiments, the one or more communication devices are selected from the group consisting of: a Wi-Fi transceiver, a cellular data transceiver and a satellite data transceiver.

In some embodiments, the control system includes one or more positioning systems.

In some embodiments, the one or more positioning systems are selected from the group consisting of: space-based global navigation satellite system receiver, a global positioning system (GPS) receiver, a Galileo positioning system receiver, a radar positioning system and an ultrasonic positioning system.

In some embodiments, the aqua-robotic pollutant removing device further comprises one or more pollutant sensors.

In some embodiments, to control system is configured to activate rotational movement of the pollutant absorbing belt in response to a pollutant diction signal generated by the one or more pollutant sensors.

In some embodiments, the aqua-robotic pollutant removing device further comprises a pollutant removing unit constructed and arranged to extract pollutants from the pollutant absorbing belt.

In some embodiments, the pollutant removing unit collects the extracted pollutants.

In some embodiments, at least a portion of the extracted pollutants are refined by the pollutant removing unit.

In another aspect, an aqua-robotic pollutant removing system comprises a plurality of aqua-robotic pollutant removing devices. Each aqua-robotic pollutant removing device of the plurality of aqua-robotic pollutant removing devices includes a buoyant body, a pollutant absorbing belt coupled to the buoyant body and extending outward from the buoyant body, and a controller system configured to transmit or receive location data and contaminant data to other aqua-robotic pollutant removing devices of the plurality of aqua-robotic pollutant removing devices. The pollutant absorbing belt is constructed and arranged to absorb pollutants from a water body.

In some embodiments, the plurality of aqua-robotic pollutant removing devices are configured in a peer-to-peer communication mode.

In some embodiments, a first aqua-robotic pollutant removing device of the plurality of aqua-robotic pollutant removing devices is configured to transmit location data and contaminate data to the other aqua-robotic pollutant removing devices of the plurality of aqua-robotic pollutant removing devices.

In some embodiments, the first aqua-robotic pollutant removing device and the other aqua-robotic pollutant removing devices are configured to swarm a geographical location corresponding to the location data transmitted by the first aqua-robotic pollutant removing device.

In some embodiments, the first aqua-robotic pollutant removing device and the other aqua-robotic pollutant removing devices swarm the geographical location in response to contaminant data indicating the presence of pollutants within the water body.

In some embodiments, the plurality of aqua-robotic pollutant removing devices are configured in a centralized communication mode.

In some embodiments, the aqua-robotic pollutant removing system further comprises a command/control system configured to receive the location data and the contamination data from each of each aqua-robotic pollutant removing device of the plurality of aqua-robotic pollutant removing devices.

In some embodiments, the command/control system is configured to generate an action response plan based on the received location data and the received contamination data.

In some embodiments, the command/control system is configured to transmit a navigational route and control sequence to each aqua-robotic pollutant removing device of the plurality of aqua-robotic pollutant removing devices in response to the generated action response plan.

In some embodiments, the controller system includes a pollutant sensor configured to generate the contaminate data based on a level of pollutants detected in the water body.

In some embodiments, the pollutant sensor is coupled to the buoyant body, the pollutant.

In some embodiments, the controller system includes a positioning system configured to generate the location data.

In some embodiments, the location data corresponds to a geographical location of the aqua-robotic pollutant removing device.

In some embodiments, the positioning system coupled to the buoyant body.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

DETAILED DESCRIPTION OF EMBODIMENTS

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

FIGS. 1-5 are views of an aqua-robotic pollutant removing device in accordance with other embodiments of the present inventive concepts. An aqua-robotic pollutant removing device 100 comprises a buoyant body 110, an electromechanical housing 120 and a pollutant absorbing belt 130. The aqua-robotic pollutant removing device 100 may be configured to collect pollutants and/or exogenous bodies dispersed about a surface of a water body, such as a pond, lake or ocean. Additionally or alternatively, the aqua-robotic pollutant removing device 100 may be configured to dive below a surface of a water body to collect pollutants.

Figure 1:
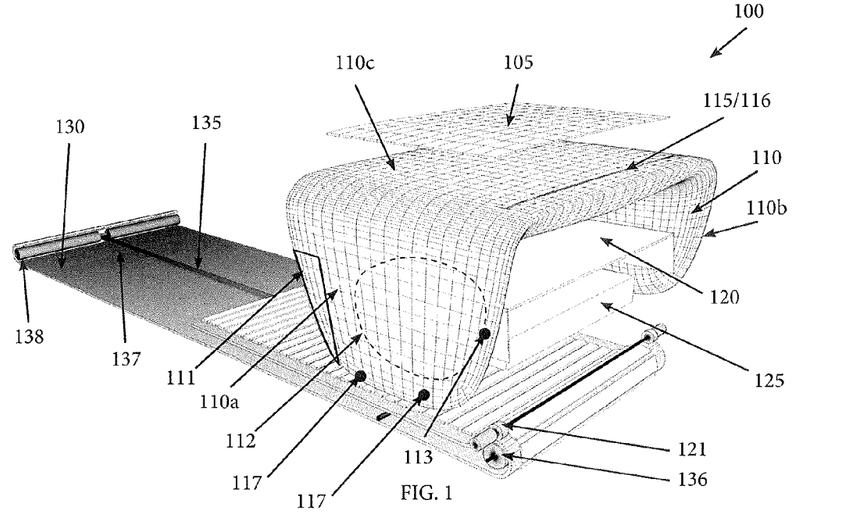
FIG. 1 is a perspective side view of an aqua-robotic pollutant removing device in accordance with other embodiments of the present inventive concepts.
Figure 2:
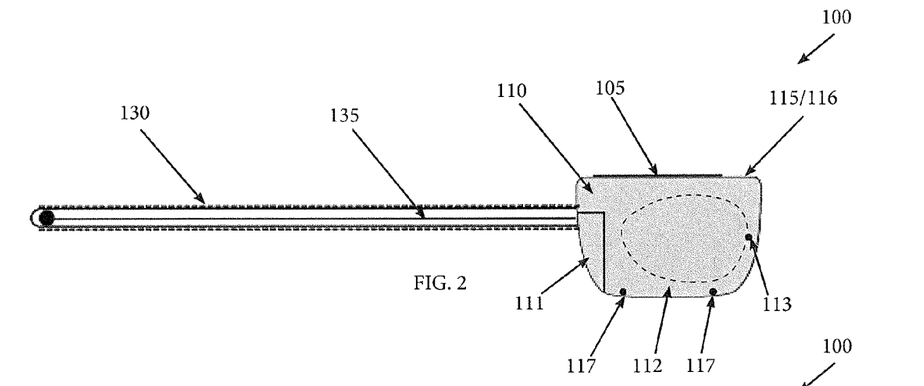
FIG. 2 is an exterior side view of the aqua-robotic pollutant removing device of FIG. 1 in accordance with other embodiments of the present inventive concepts.
Figure 3:
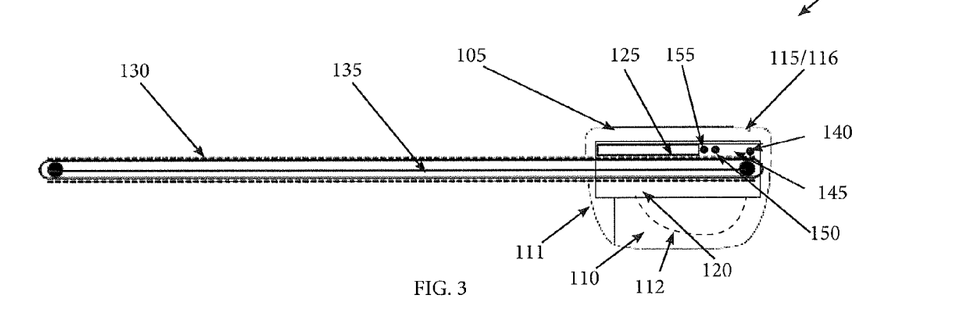
FIG. 3 is an interior side view of the aqua-robotic pollutant removing device of FIG. 1 in accordance with other embodiments of the present inventive concepts.
Figure 4:
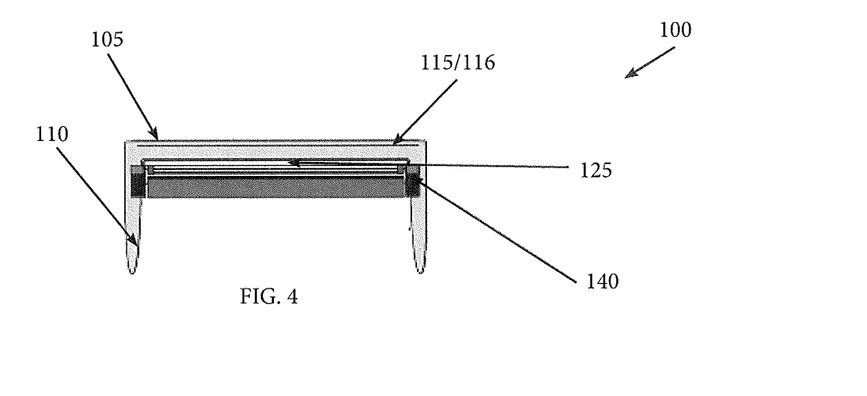
FIG. 4 is a frontal view of the aqua-robotic pollutant removing device of FIG. 1 in accordance with other embodiments of the present inventive concepts.
Figure 5:
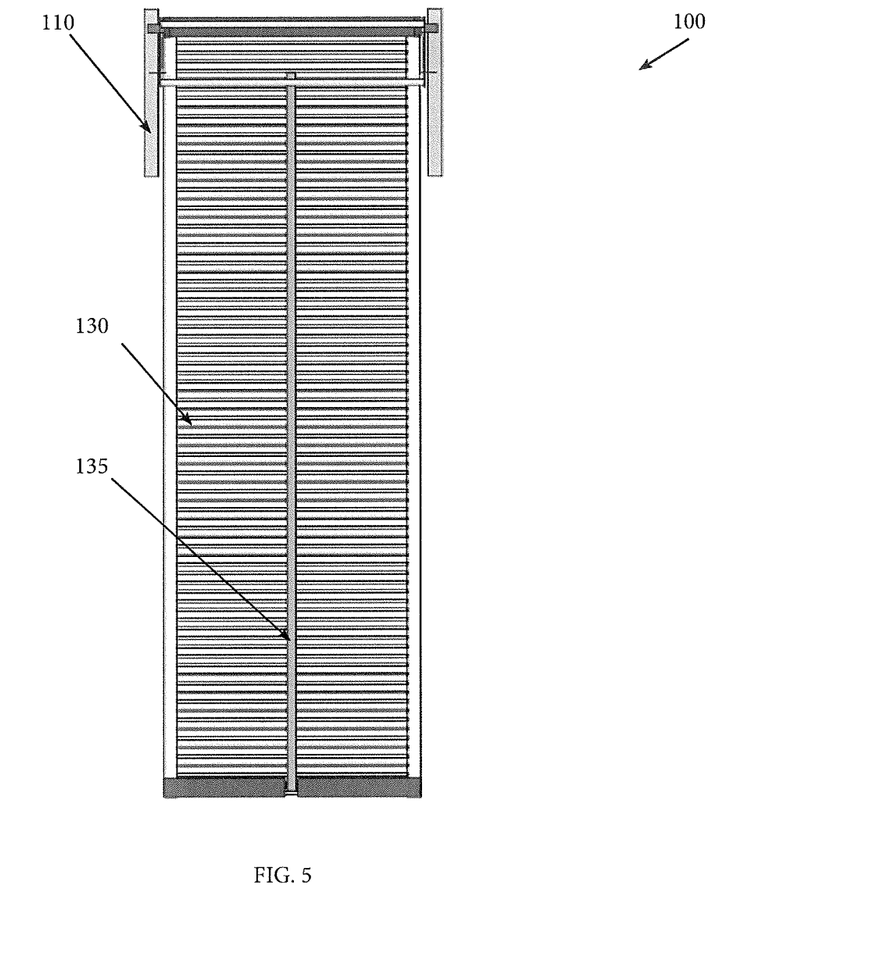
FIG. 5 is a bottom-up view of the aqua-robotic pollutant removing device of FIG. 1 in accordance with other embodiments of the present inventive concepts.
Figure 6:
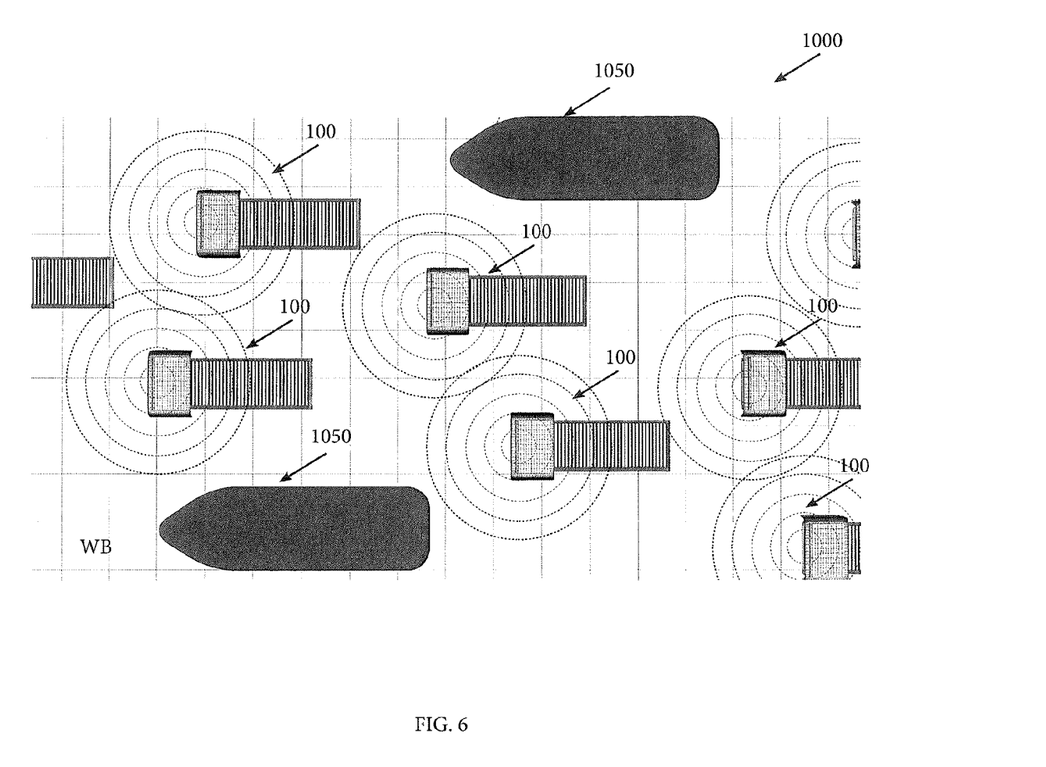
FIG. 6 illustrates a system of aqua-robotic pollutant removing devices navigating a water body in accordance with other embodiments of the present inventive concepts.

The buoyant body 110 may include a foam material, a plastic material and/or a rubber material, and may be constructed and arranged in manner that permits the aqua-robotic pollutant removing device 100 to float on a surface of a water body (e.g., water body WB shown in FIG. 6). For example, in the embodiment shown in FIGS. 1-5, the buoyant body 110 is shaped to displace a weight of fluid greater than a weight of the aqua-robotic pollutant removing device 100. In this manner, the buoyant body 110 can be constructed and arranged to have an equilibrium state that corresponds to a longitudinal axis of extension of the pollutant absorbing belt 130.

In some embodiments, the buoyant body 110 is constructed and arranged to maintain a constant level of floatation within a water body. To achieve this result, the buoyant body 110 may include a bladder 112 and a pump 113. The pump 113 may be configured to take in or expel water from the bladder 112 so as to adjust the buoyancy of the aqua-robotic pollutant removing device 100.

The buoyant body 110 may include first and second fin portions 110a-b extending transversely from opposite sides of a central portion 110c of the buoyant body 110. The first and second fin portions 110a-b and the central portion 110c of the buoyant body 110 may be integrally joined (e.g., molded or formed into a single body portion). However, in other embodiments the buoyant body 110 may be formed of individual body portions.

The buoyant body 110 may include one or more rudders 111 that are constructed and arranged to steer the aqua-robotic pollutant removing device 100. For example, each of the first and second fin portions 110a-b of the buoyant body 110 may include a rudder 111.

The pollutant absorbing belt 130 may include an oil-absorbing belt and/or a nanowire fabric. The oil-absorbing belt and/or the nanowire fabric may be constructed to absorb greater than 15 times its weight in organic pollutants. The nanowire fabric may include a plurality of potassium manganese oxide wires.

The electromechanical housing 120 is coupled to the buoyant body 110, and is constructed and arranged to rotate the pollutant absorbing belt 130 so as to facilitate the removal of pollutants from the surface of water bodies. The pollutant absorbing belt 130 is coupled to the electromechanical housing 120 via a conveyor belt housing 135. In the embodiments shown in FIGS. 1-5, the electromechanical housing 120 includes one or more motors 140 that are constructed and arranged to rotate a drive shaft 121 of the electromechanical housing 120, which mates with a drive wheel 136 of the conveyor belt housing 135.

The conveyor belt housing 135 is coupled to the mechanical housing 120 of the aqua-robotic pollutant removing device 100 such that the pollutant absorbing belt 130 extends outward from the buoyant body 110. The pollution absorbing belt 130 is a floating conveyor belt made of a lightweight, floating material. The conveyor belt housing 135 includes a connecting member 137 that is coupled between the drive wheel 136 and an end wheel 138.

The pollutant removing unit 125 may include a pollutant processing unit that is constructed and arranged to refine the pollutants extracted from the pollutant absorbing belt 130. In this manner, the refined pollutants may be used as an energy source to power the aqua-robotic pollutant removing device 100.

The aqua-robotic pollutant removing device 100 may further comprise one or more pollutant sensors 117, which may be coupled to surfaces of the buoyant body 110. The pollutant sensors 117 may include solid state chemical sensors, imaging sensors, and/or other types of electromechanical sensor devices and systems.

Figure 8:
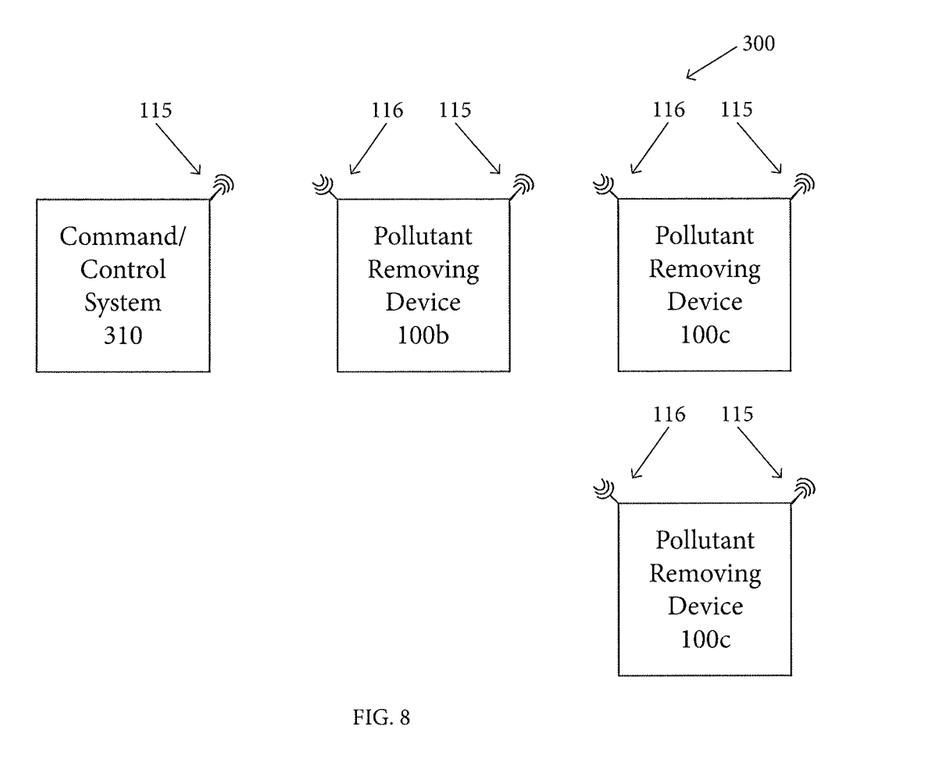
FIG. 8 is a block diagram of an aqua-robotic pollutant removing system configured in a centralized communication mode in accordance with other embodiments of the present inventive concepts.
Figure 9:
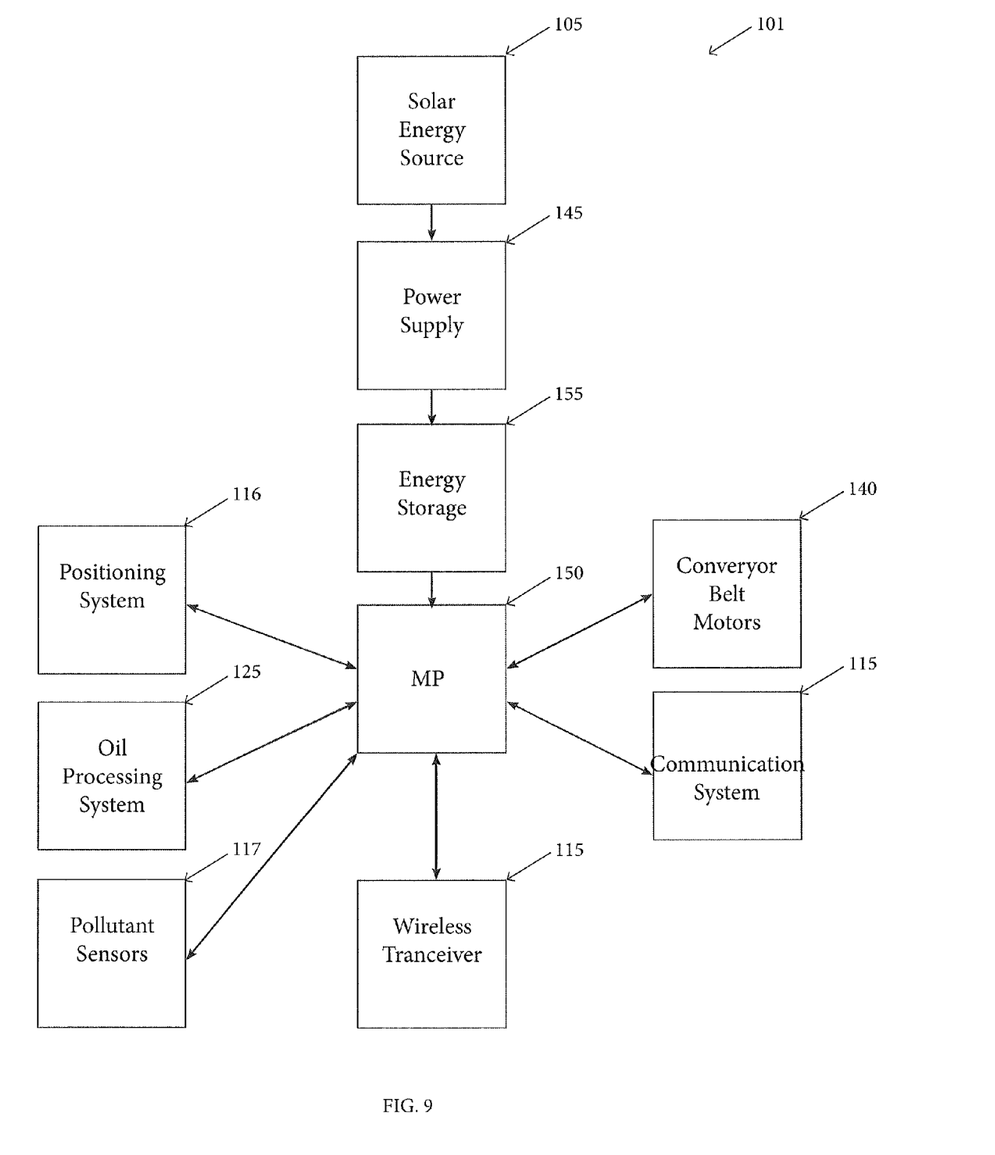
FIG. 9 is a block diagram of an aqua-robotic pollutant removing device control system in accordance with other embodiments of the present inventive concepts.

The aqua-robotic pollutant removing device 100 may further comprise a control system (e.g., control system 101 shown in FIG. 9). The control system 101 is configured to control actions of the aqua-robotic pollutant removing device 100, including the rotational velocity of the pollutant absorbing belt 130, navigational routes of the aqua-robotic pollutant removing device 100 and data transmissions of the aqua-robotic pollutant removing device 100. The pollution absorbing belt 130 simultaneously sweeps the surface of the ocean and propels itself forward. In addition, the control system 101 may be configured to transmit and/or receive location data and/or contaminant data in one of a peer-to-peer communication mode or centralized communication mode, which is described in greater detail below with reference to FIGS. 7 and 8.

The control system 101 may include a processing system 150, one or more energy storage elements 155, a power supply 145, one or more solar panels 105 (e.g., photovoltaic panels), a communication or wireless transceiver system 115 and a positioning system 116.

The one or more solar panels may be provided on an upper surface and/or central portion 110*c* of the buoyant body 110. The one or more solar panels 105 are configured to supply the control systems, motors 140, power supply 145 and/or energy storage elements 155 with electrical current. The one or more solar panels 105 may also provide other systems, devices and sensors of the aqua-robotic pollutant removing device 100 with electrical current.

The communication or wireless transceiver system 115 and the positioning system 116 may be provided on an upper surface and/or central portion 110*c* of the buoyant body 110. The communication or wireless transceiver system 115 may include a Wi-Fi transceiver, a cellular data transceiver and/or a satellite data transceiver. The positioning system 116 may include a space-based global navigation satellite system receiver, a global positioning system (GPS) receiver, a Galileo positioning system receiver, a radar positioning system and/or an ultrasonic positioning system.

FIG. 6 illustrates a system of aqua-robotic pollutant removing devices navigating a water body in accordance with other embodiments of the present inventive concepts. An aqua-robotic pollutant removing system 1000 comprises a plurality of aqua-robotic pollutant removing devices, such as the aqua-robotic pollutant removing devices 100 described above with regard to FIGS. 1-5.

The aqua-robotic pollutant removing system 1000 is configured to detect the existence of pollutants within a water body WB and to organize the collection of pollutants within the water body WB. For example, the plurality of aqua-robotic pollutant removing devices 100 may be scattered about the surface of the water body WB. Upon the detection of pollutants within the water body WB by a pollutant removing device 100, the system 1000 may organize the plurality of pollutant removing devices 100 to swarm the contaminated area where the pollutants were detected.

Further, each aqua-robotic pollutant removing device 100 may be configured in one of an on-board pollutant processing mode or an off-board pollutant processing mode. In the on-board pollutant processing mode, the pollutant processing unit of the pollutant removing device 125 may be configured to collect and store pollutants removed from the pollutant absorbing belt 130 in a storage container. The pollutant processing unit may be configured to heat the pollutants so as to burn-off the pollutants in a controlled manner, such as a controlled burn procedure. The pollutant processing unit may include a filtration device to reduce the amount of air pollutants released during the controlled burn. Alternatively or additionally, in the on-board pollutant processing mode, the pollutant processing unit may be provided with micro-organisms that can digest the pollutants, or other organic compounds that may break down pollutants. Such biomediation and biotransformation methods may be used to harness the ability of microbial xenobiotic metabolism to degrade, transform or accumulate a range of compounds, including hydrocarbons (oil), polychlorinated biphenyls (PCBs), polyaromatic hydrocarbons (PAHs), heterocyclic compounds (such as pyridine or quinolone, pharmaceutical substances, radionuclides and metals.

In the off-board pollutant processing mode, the pollutant removing device 125 may be configured to collect and store pollutants removed from the pollutant absorbing belt 130 in a storage container. A secondary storage and/or processing vehicle 1050 may be provided to gather the pollutants collected by the aqua-robotic pollutant removing devices 100. The secondary storage and/or processing vehicle 1050 may collect and transport the pollutants to a land based pollutant processing system, or alternatively, the secondary storage and/or processing vehicle 1050 may process the pollutants on-board in any of manners described above (e.g., control burning or micro-organism processing).

Further, the secondary storage and/or processing vehicle 1050 may be configured to replace and/or repair the pollutant absorbing belts 130 of the aqua-robotic pollutant removing devices 100. For example, the secondary storage and/or processing vehicle 1050 may gather the pollutant absorbing belt 130 from the devices directly, or may gather a pollutant absorbing belt 130 that has been "shedded" from the devices 100, and released into the water body WB for pick-up.

The aqua-robotic pollutant removing devices 100 may further collect pollutants in containers or bags having RFID tags, which can be gathered by the secondary storage and/or processing vehicle 1050. The secondary storage and/or processing vehicle 1050 may be configured to gather the pollutant-filled bags from the devices 100 directly, or may gather the pollutant-filled bags that have been "shedded" from the device 100, and released into the water body WB for pick-up As described above, each pollutant removing devices 100 comprises a control system (e.g., control system 101 shown in FIG. 9) that may be configured to transmit and/or receive location data and/or contaminant data in one of a peer-to-peer communication mode or centralized communication mode, which is now described in greater detail below with reference to FIGS. 7 and 8.

Figure 7:
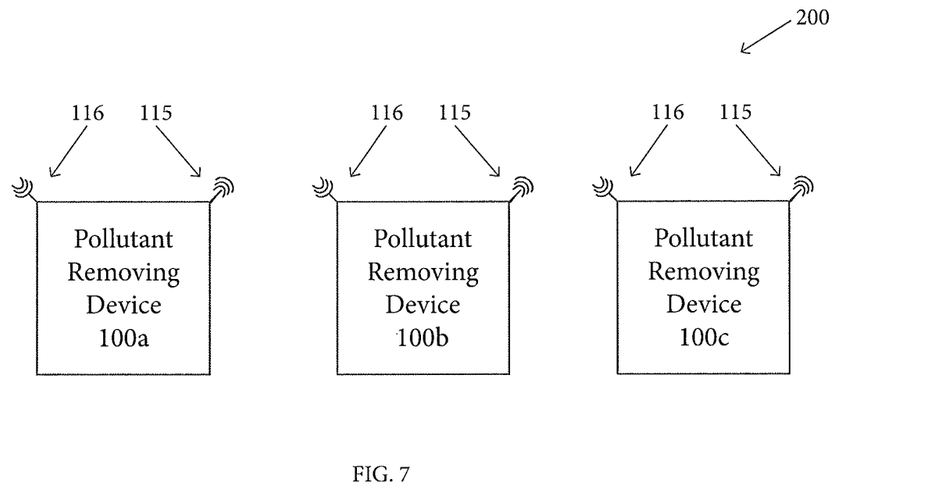
FIG. 7 is a block diagram of an aqua-robotic pollutant removing system configured in a peer-to-peer communication mode in accordance with other embodiments of the present inventive concepts.

FIG. 7 is a block diagram of an aqua-robotic pollutant removing system configured in a peer-to-peer communication mode in accordance with other embodiments of the present inventive concepts. In a peer-to-peer communication mode 200, a plurality of aqua-robotic pollutant removing devices 100*a-c* are each provided with communication or wireless transceiver systems 115 and positioning systems 116 so that each aqua-robotic pollutant removing devices 100*a-c* can transmit and/or receive location data and contaminant data to/from other aqua-robotic pollutant removing devices 100*a-c*. For example, a first aqua-robotic pollutant removing device 100*a* of the plurality of aqua-robotic pollutant removing devices 100*a-c* can transmit location data and contaminate data to the other aqua-robotic pollutant removing devices 100*b-c*. In response the transmission of location data and contaminate data by the first aqua-robotic pollutant removing device 100*a*, the other aqua-robotic pollutant removing devices 100*b-c* can be configured to swarm a geographical location corresponding to the location data transmitted by the first aqua-robotic pollutant removing device 100*a*. In this manner, the plurality of aqua-robotic pollutant removing devices 100 can swarm the contaminated area where the pollutants were detected by the first aqua-robotic pollutant removing device 100*a*.

FIG. 8 is a block diagram of an aqua-robotic pollutant removing system configured in a centralized communication mode in accordance with other embodiments of the present inventive concepts. In a centralized communication mode 300, a command/control system 310 and a plurality of aqua-robotic pollutant removing devices 100*a-c* are provided. The command/control system 310 is provide with a communication or wireless transceiver system 115, and each of the aqua-robotic pollutant removing devices 100*a-c* are provided with a communication or wireless transceiver system 115 and a positioning system 116 so that each aqua-robotic pollutant removing devices 100*a-c* can transmit location data and contaminant data to the command/ control system 310. In response to the received location data and contaminant data, the command/control system 310 may transmit navigational routes and control sequences to the plurality aqua-robotic pollutant removing devices 100a-c.

For example, the command/control system 310 may be configured to receive the location data and the contamination data from one or more of the aqua-robotic pollutant removing devices 100a-c, and may be configured to generate an action response plan based on the received location data and the received contamination data. The command/control system 310 may also generate the action response plan based on data entered by a user of the system. After generating the action response plan, the command/control system 310 may transmit navigational routes and control sequences to the plurality of aqua-robotic pollutant removing devices 100a-c. In this manner, the plurality of aqua-robotic pollutant removing devices 100 can swarm the contaminated area where the pollutants were detected.

FIG. 9 is a block diagram of an aqua-robotic pollutant removing device control system in accordance with other embodiments of the present inventive concepts. The aqua-robotic pollutant removing devices 100 comprise a control system 101. The control system 101 is configured to control actions of the aqua-robotic pollutant removing devices 100, including the rotational velocity of the pollutant absorbing belt 130, navigational routes of the aqua-robotic pollutant removing devices 100 and data transmissions of the aqua-robotic pollutant removing devices 100. In addition, the control system 101 may be configured to transmit and/or receive location data and/or contaminant data in one of a peer-to-peer communication mode or centralized communication mode.

The control system may include a processing system 150, one or more energy storage elements 155, a power supply 145, one or more solar panels 105 (e.g., photovoltaic panels), a communication or wireless transceiver system 115 and a positioning system 116.

The processing system 150 may include microprocessor based system, which may include a microprocessor, memory and input/output devices. The one or more energy storage elements 155 may include one or more rechargeable batteries and/or capacitors. The power supply 145 may be configured to adjust a current supplied by the one or more solar panels 145 so that the current may be used to charge the energy storage element 155 and/or power the other devices and systems of the control system 101.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. An aqua-robotic pollutant removing device, comprising:
a buoyant body floating on a surface of a water body;
an electromechanical housing coupled to the buoyant body; and
a buoyant pollutant absorbing belt made of a floating material coupled to the electromechanical housing via a pollutant absorbing belt housing and extending outward from the buoyant body;
wherein the electromechanical housing includes a motor constructed and arranged to rotate a drive member of the electromechanical housing which mates with a drive member of the pollutant absorbing belt housing to rotate the pollutant absorbing belt to simultaneously sweep the surface of the water body and to propel the pollutant absorbing belt, and the buoyant body and electromechanical housing coupled thereto, forward.

2. The aqua-robotic pollutant removing device of claim 1, wherein the body includes a foam material.

3. The aqua-robotic pollutant removing device of claim 1, wherein the body includes one or more rudders that are constructed and arranged to steer the device.

4. The aqua-robotic pollutant removing device of claim 1, wherein the electromechanical housing includes one a plurality of motors constructed and arranged to rotate the pollutant absorbing belt.

5. The aqua-robotic pollutant removing device of claim 1, wherein the pollutant absorbing belt includes an oil-absorbing belt.

6. The aqua-robotic pollutant removing device of claim 1, wherein the pollutant absorbing belt includes a nanowire fabric.

7. The aqua-robotic pollutant removing device of claim 6, wherein the nanowire fabric is constructed to absorb greater than 15 times its weight in organic pollutants.

8. The aqua-robotic pollutant removing device of claim 6, wherein the nanowire fabric includes a plurality of potassium manganese oxide wires.

9. The aqua-robotic pollutant removing device of claim 1, further comprising a control system configured to control the rotational velocity of the pollutant absorbing belt.

10. The aqua-robotic pollutant removing device of claim 9, further comprising one or more photovoltaic panels.

11. The aqua-robotic pollutant removing device of claim 10, wherein the one or more photovoltaic panels are provided on an upper surface of the buoyant body.

12. The aqua-robotic pollutant removing device of claim 10, wherein the one or more photovoltaic panels are configured to supply the control system and actuators of the electromechanical housing with electrical current.

13. The aqua-robotic pollutant removing device of claim 9, wherein the control system includes one or more communication devices.

14. The aqua-robotic pollutant removing device of claim 13, wherein the one or more communication devices are selected from the group consisting of: a Wi-Fi transceiver, a cellular data transceiver and a satellite data transceiver.

15. The aqua-robotic pollutant removing device of claim 9, wherein the control system includes one or more positioning systems.

16. The aqua-robotic pollutant removing device of claim 15, wherein the one or more positioning systems are selected from the group consisting of: space-based global navigation satellite system receiver, a global positioning system (GPS) receiver, a Galileo positioning system receiver, a radar positioning system and an ultrasonic positioning system.

17. The aqua-robotic pollutant removing device of claim 9, further comprising one or more pollutant sensors.

18. The aqua-robotic pollutant removing device of claim 17, wherein to control system is configured to activate rotational movement of the pollutant absorbing belt in response to a pollutant diction signal generated by the one or more pollutant sensors.

19. The aqua-robotic pollutant removing device of claim 9 further comprising a pollutant removing unit constructed and arranged to extract pollutants from the pollutant absorbing belt.

20. The aqua-robotic pollutant removing device of claim 19, wherein the pollutant removing unit collects the extracted pollutants.

21. The aqua-robotic pollutant removing device of claim 19, wherein at least a portion of the extracted pollutants are refined by the pollutant removing unit.

22. An aqua-robotic pollutant removing system, comprising:
- a plurality of aqua-robotic pollutant removing devices, each aqua-robotic pollutant removing device of the plurality of aqua-robotic pollutant removing devices including:
- a buoyant body floating on a surface of a water body;
- a buoyant pollutant absorbing belt made of a floating material coupled to the buoyant body through an electromechanical housing and extending outward from the buoyant body, the pollutant absorbing belt constructed and arranged to absorb pollutants from the water body and to propel the pollutant absorbing belt and the buoyant body coupled thereto; and
- a controller system configured to transmit or receive location data and contaminant data to other aqua-robotic pollutant removing devices of the plurality of aqua-robotic pollutant removing devices, wherein the electromechanical housing includes a motor to rotate a drive member of the electromechanical housing which mates with a drive member of the pollutant absorbing belt to rotate the pollutant absorbing belt.

23. The aqua-robotic pollutant removing system of claim 22, wherein the plurality of aquarobotic pollutant removing devices are configured in a peer-to-peer communication mode.

24. The aqua-robotic pollutant removing system of claim 23, wherein a first aqua-robotic pollutant removing device of the plurality of aqua-robotic pollutant removing devices is configured to transmit location data and contaminate data to the other aqua-robotic pollutant removing devices of the plurality of aqua-robotic pollutant removing devices.

25. The aqua-robotic pollutant removing system of claim 24, wherein the first aqua-robotic pollutant removing device and the other aqua-robotic pollutant removing devices are configured to swarm a geographical location con-esponding to the location data transmitted by the first aquarobotic pollutant removing device.

26. The aqua-robotic pollutant removing system of claim 25, wherein the first aqua-robotic pollutant removing device and the other aqua-robotic pollutant removing devices swarm the geographical location in response to contaminant data indicating the presence of pollutants within the water body.

27. The aqua-robotic pollutant removing system of claim 22, wherein the plurality of aquarobotic pollutant removing devices are configured in a centralized communication mode.

28. The aqua-robotic pollutant removing system of claim 27, further comprising a command/control system configured to receive the location data and the contamination data from each of each aqua-robotic pollutant removing device of the plurality of aqua-robotic pollutant removing devices.

29. The aqua-robotic pollutant removing system of claim 28, wherein the command/control system is configured to generate an action response plan based on the received location data and the received contamination data.

30. The aqua-robotic pollutant removing system of claim 29, wherein the command/control system is configured to transmit a navigational route and control sequence to each aqua-robotic pollutant removing device of the plurality of aqua-robotic pollutant removing devices in response to the generated action response plan.

31. The aqua-robotic pollutant removing system of claim 22, wherein the controller system includes a pollutant sensor configured to generate the contaminate data based on a level of pollutants detected in the water body.

32. The aqua-robotic pollutant removing system of claim 31, wherein the pollutant sensor is coupled to the buoyant body, the pollutant.

33. The aqua-robotic pollutant removing system of claim 22, wherein the controller system includes a positioning system configured to generate the location data.

34. The aqua-robotic pollutant removing system of claim 23, wherein the location data corresponds to a geographical location of the aqua-robotic pollutant removing device.

35. The aqua-robotic pollutant removing system of claim 23, wherein the positioning system coupled to the buoyant body.

* * * * *